INVENTOR
RALPH L. ANDERSON

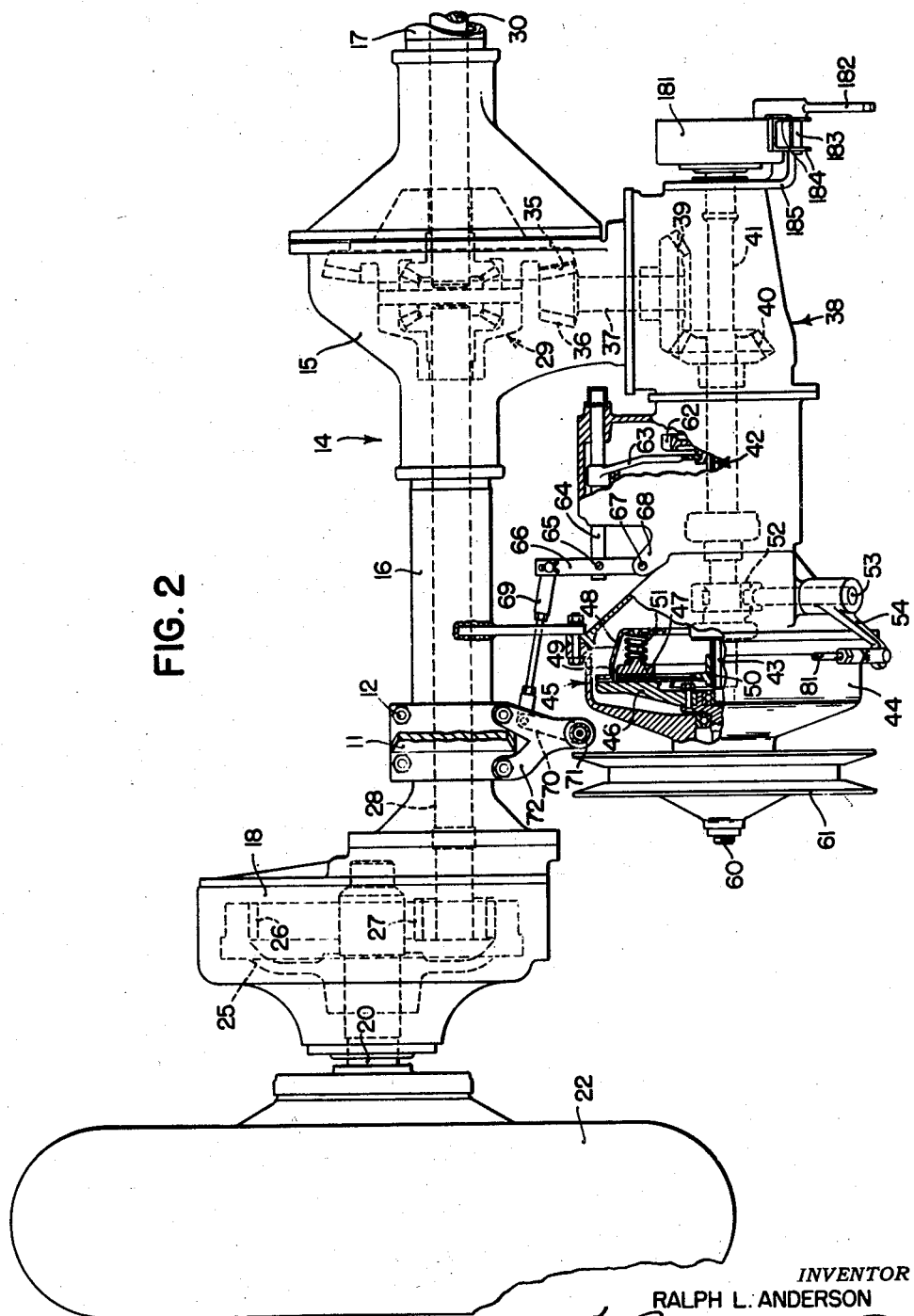

June 6, 1950   R. L. ANDERSON   2,510,325
BELT AND GEAR DRIVE FOR SELF-PROPELLED IMPLEMENTS
Filed Jan. 31, 1947   3 Sheets-Sheet 3

*INVENTOR*
RALPH L. ANDERSON
BY
*ATTORNEYS*

Patented June 6, 1950

2,510,325

UNITED STATES PATENT OFFICE 2,510,325

BELT AND GEAR DRIVE FOR SELF-PROPELLED IMPLEMENTS

Ralph L. Anderson, Moline, Ill., assignor to Deere & Company, Moline, Ill., a corporation of Illinois Application January 31, 1947, Serial No. 725,629

2 Claims. (Cl. 180—70)

The present invention relates generally to self-propelled implements and other vehicles and more particularly to the drive connections therefor, and has for its principal object the provision of a novel and improved adjustable speed drive between the power plant and the traction wheels.

A self-propelled implement, such as a combine, corn picker or the like, is usually provided with a single power plant, such as an internal combustion engine, which must furnish power not only for propelling the implement along the ground, but also for driving the harvesting and crop treating mechanism. In a machine of this type, it is desirable to drive the crop treating mechanism at a substantially constant speed which will provide maximum efficiency of the mechanism, while propelling the implement at adjustable speeds to control the implement over varying ground and crop conditions, as is well known to those skilled in the art. Heretofore, this has been accomplished by means of change speed gears in the drive connection between the power plant and the traction wheels, the crop treating mechanism being driven directly from the power plant. This is not, however, a complete solution of the problem, for the number of speeds at which the implement can be propelled is limited to the number of gear combinations in the transmission mechanism, inasmuch as the engine or power plant must always be driven at a substantially constant speed during operation in the field.

It has been proposed to use an infinitely adjustable speed transmission mechanism in combination with a change speed gear mechanism, the infinitely adjustable mechanism being designed to bridge the gap between the various gear changes.

It is, therefore, a more specific object of my invention to provide a simplified, novel and improved power transmitting connection between the power plant and the traction wheels, employing change speed gears and infinitely variable speed transmission mechanism, which is light in weight, inexpensive to manufacture and maintain, and flexible in operation.

A still more specific object relates to the provision of a power transmitting connection of the class described, in which the infinitely adjustable mechanism comprises an adjustable V-belt drive. A related object has to do with the provision that the V-belts and sheaves are always running at their normal speed of operation during starting of the implement. This avoids the imposing of heavy tension stresses in the V-belts when the latter are stationary, thereby avoiding considerable breakage of the V-belts.

Another specific object relates to the provision of a drive in which there is no necessity for adjustment of the adjustable speed V-belt sheaves while the belts are stationary. It is very difficult to shift the conical elements of a V-belt pulley toward each other while the belt trained around that pulley is stationary, inasmuch as the belt must be squeezed radially outwardly between the elements. Still another object relates to the provision that the momentum of the belts and pulleys is not transmitted to the change speed gears to interfere with the gear shifting operation.

These and other objects and advantages of my invention will be apparent to those skilled in the art after a consideration of the following description, in which reference is had to the drawings appended hereto, in which Figure 1 is a fragmentary side elevational view showing a portion of a self-propelled combine embodying the principles of the present invention, with the near traction wheel and gear case omitted to more clearly show the invention;

Figure 2 is a fragmentary top plan view showing one of the traction wheels, a portion of the axle housing and the power transmitting housing including the change gear mechanism and clutch mechanism, portions of which are broken away to expose the mechanism, and drawn to an enlarged scale;

Figure 1:
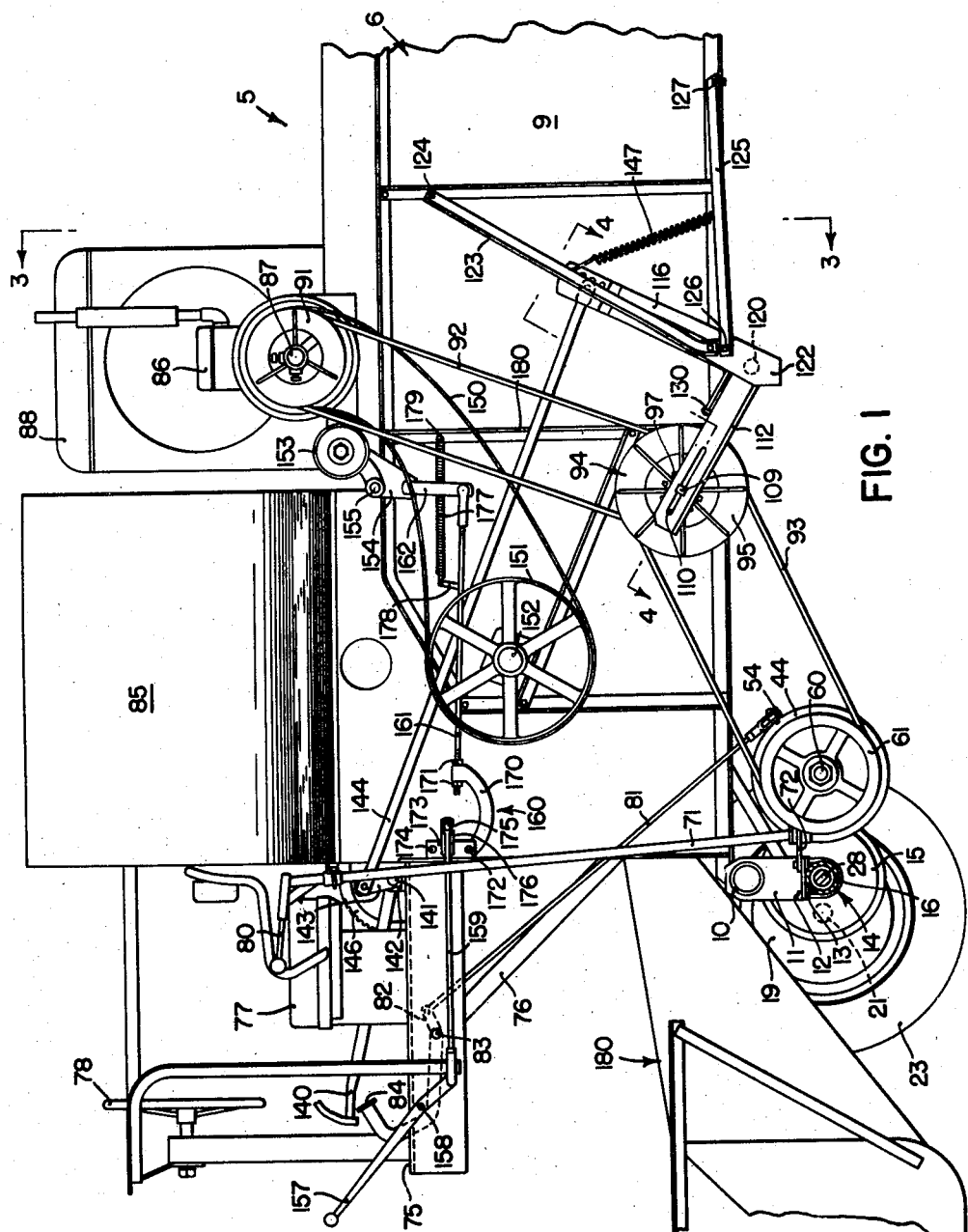

Referring now to the drawings, the self-propelled combine is indicated in its entirety by reference numeral 5 and comprises a crop treating housing or body 6 comprising top and bottom and side walls 7, 8, 9, respectively. The threshing and separating mechanism within the housing 6 is not shown inasmuch as the details thereof are not essential in describing the present invention. The forward end of the body 6 is mounted on a transverse tubular beam 10, which is supported on brackets 11, which are secured by bolts 12 to bosses which are cast integrally with a transversely disposed axle housing 14 under the housing 6.

The axle housing 14 comprises a centrally disposed differential casing 15 having a pair of tubular casings 16, 17 extending laterally oppositely therefrom. The outer ends of the tubular casings 16, 17 are fixed to a pair of reduction gear housings 18, 19, respectively, which are carried on a pair of stub axles 20, 21 which are journalled in the housings 18, 19, respectively, and which project outwardly therefrom and are mounted on traction wheels 22, 23, respectively. The stub axle 20 is provided with a hub 25 rigidly fixed thereto, on which is mounted an internal ring gear 26 which meshes with a pinion 27 splined on a main axle shaft 28, which extends through the tubular casing 16 into the differential casing 15. The axle shaft 28 is connected, through conventional differential gear mechanism 29 within the housing 14, to a similar axle shaft 30 which drives the opposite wheel 23. The ring gear 35 of the differential mechanism 29 meshes with a pinion 36 on a shaft 37 which is rotatably mounted on a fore and aft extending axis and which projects rearwardly into a transmission housing 38. A bevel gear 39 on the shaft 37 meshes with a bevel gear 40 fixed to a transverse power shaft 41 extending through the transmission housing 38. The power shaft 41 is connected, through change speed gear mechanism of any suitable type known to those skilled in the art and indicated generally by reference numeral 42, to a coaxially disposed clutch shaft 43 extending into a clutch housing 44. Within the clutch housing 44 is a conventional friction clutch 45 comprising a first clutch element 46 adapted to rotate continuously and a shiftable clutch element 47 mounted on a bracket 48 secured to the continuously rotatable element 46. A clutch plate 49 between the two elements 46, 47 is supported on a hub 50 splined on the clutch shaft 43. A number of coil springs 51 urge the shiftable element 47 toward the continuously rotating element 46 to engage the clutch plate 49 therebetween, but the shiftable element 47 is shiftable axially to disengage the clutch, by means of a shifting fork 52 mounted on a supporting shaft 53 which extends outwardly of the clutch housing 44 and carries a control arm 54, by means of which the clutch 45 can be disengaged and engaged to control the transmission of power from the continuously rotatable clutch element 46 through the differential mechanism 29 to the traction wheels 22, 23.

The continuously rotating clutch element 46 is mounted on a shaft 60 which extends laterally out of the clutch housing 44 and on which is rigidly mounted a V-belt sheave 61.

The change speed gear mechanism 42 includes a shiftable gear 62 on the splined power shaft 41, which is shiftable into and out of mesh with a suitable drive gear (not shown) by means of a shifting fork 63 mounted on a shifting rod 64 which is slidable within the transmission housing 38 and extends outwardly thereof and is pivotally connected at 65 to a shift lever 66 which is pivotally mounted at 67 on a bracket 68 on the outside of the housing 38. The lever 66 is connected by means of a link 69 to an arm 70 mounted on a control shaft 71 which is supported on a bracket 72 fixed to the axle housing 14.

An operator's platform 75 is supported on the forward end of the crop treating housing 6 by means of diagonal bracing members 76 and carries an operator's seat 77 and a steering wheel 78, by means of which the machine can be guided. The gear shift control shaft 71 extends substantially vertically from the control arm 70 to the operator's platform 75 and is provided at its upper end with a gear shift control lever 80 within convenient reach of the operator's seat 77, by means of which the operator can shift the shiftable gear 62 to change the ratio of the change speed gear mechanism 42.

The clutch control arm 54 is connected through a link 81 with a clutch control lever 82 rockably mounted on a shaft 83 beneath the operator's platform 75. A foot pedal 84 on the clutch lever 82 is disposed in front of the seat 77 and provides the operator with a convenient and conventional control of the disengageable clutch 45.

Directly behind the operator's platform 75 and on top of the crop treating housing 6 is disposed a grain storage tank 85. Behind the storage tank 85 is disposed a power plant 86 in the form of an internal combustion engine, disposed with its drive shaft 87 rotatable about a transverse axis. The cooling radiator for the engine 86 is indicated at 88. The engine 86, as well as the grain storage tank 85 and the operator's platform 75, is disposed substantially centrally of the crop treating housing 6 in balanced relation, but the drive shaft 87 overhangs the left side wall 9 of the housing 6 and carries a cylindrical pulley 90 and a V-belt sheave 91.

The V-belt sheave 91 is connected to drive the V-belt sheave 61 through a pair of V-belts 92, 93 and an adjustable V-belt sheave 94. The adjustable sheave 94 comprises a pair of opposed conical sheave elements 95, 96, which are rigidly fixed, as by bolts 97, at opposite ends of a cylindrical drum 98. A third sheave element 99 is disposed between the two relatively fixed elements 95, 96 and comprises a pair of opposed conical elements 100, 101 rigidly bolted together by means of bolts 102 and slidable axially on the drum 98. A key 103 between the elements 99 and drum 98 prevents relative rotation therebetween while permitting axial sliding movement between the two end elements 95, 96. Thus, elements 95 and 100 define one V-belt sheave having radially inwardly converging conical driving surfaces to receive the V-belt 92, while the other two elements 96, 101 define a second adjustable V-belt sheave having radially inwardly converging conical driving surfaces to receive the other V-belt 93.

The drum 98 is provided with a pair of outwardly turned bearing flanges 104, 105, which are rotatably mounted on a pair of ball bearings 106, 107 at opposite ends of the tubular shaft 108. A supporting bolt 109 extends axially through the shaft 108 and through a pair of slots 110, 111 in a pair of supporting arms 112, 113, respectively. The arms 112, 113 are constructed of a pair of structural angle members and are rigidly fixed, as by welding at 114, to a supporting tube 115, from which the arms 112, 113 extend radially and form one arm of a bell crank which also includes a second arm 116 also welded to the tube 115 and extending radially therefrom at an angle of approximately ninety degrees to the supporting arms 112, 113.

The bell crank is supported on a shaft 120, which is disposed transversely of the direction of travel of the combine and which is carried at its inner end on an angle bracket 121 secured to the bottom 8 of the crop treating housing 6, while the outer end of the shaft 120 is mounted in a bracket 122 which is supported on an outwardly and downwardly inclined frame member 123 bolted at 124 to the side wall 9. A horizontal brace 125 is bolted at 126 to the bracket 122 and extends rearwardly and inclines toward the side wall 9, to which it is rigidly fixed, as by a bolt 127.

Figure 4:
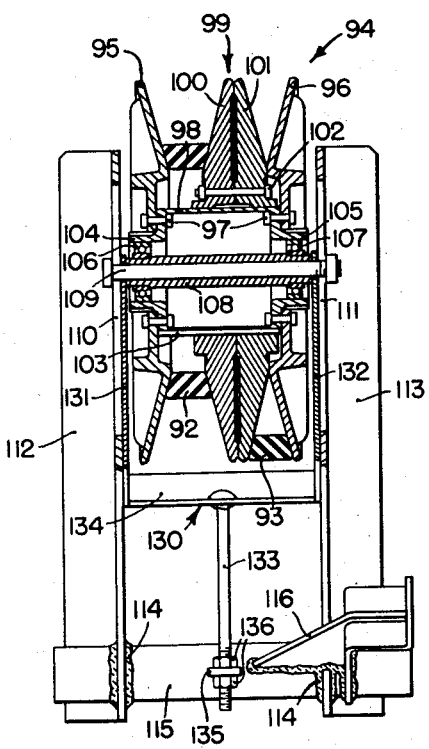
Figure 4 is an enlarged view taken along a line 4—4 in Figure 1.
Figure 3:
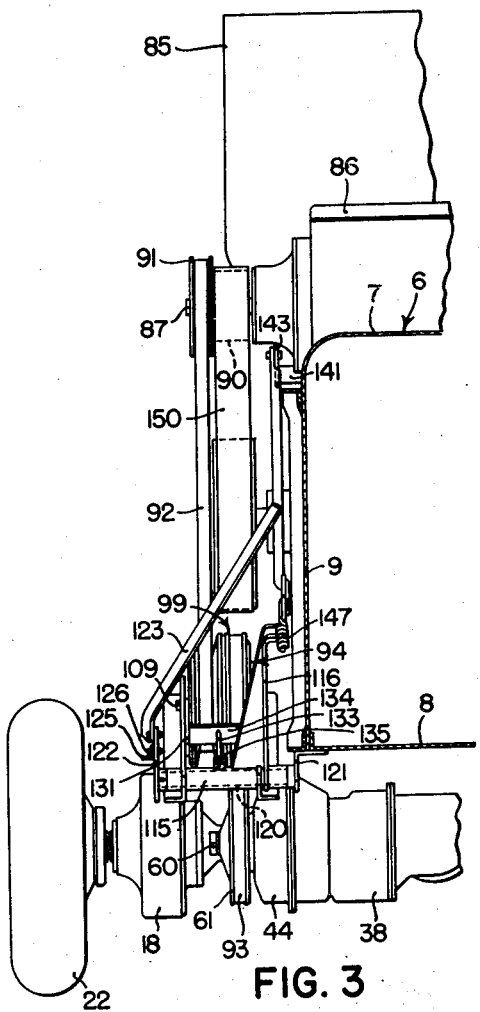
Figure 3 is a fragmentary elevational view taken in section along a line 3—3 in Figure 1 but omitting the crop treating mechanism within the body of the implement.

The adjustable sheave 94 is disposed alongside the side wall 9 and approximately midway between the two V-belt sheaves 61, 91, and the supporting arms 112, 113 are disposed at such an angle to the belts 92, 93 that rocking of the bell crank about the supporting shaft 120 moves the adjustable sheave 94 toward one of the V-belt sheaves 61 and away from the other sheave 91, or vice versa. The intermediate sheave element 99 is freely slidable axially on the drum 98, with the result that, as the arms 112, 113 are swung downwardly away from the drive sheave 91, the belt 92 is forced inwardly of the groove between the elements 95, 100, thereby forcing the intermediate element 99 axially toward the sheave element 96 and thereby forcing the other V-belt 93 radially outwardly. Thus, the belt 93 is trained around a maximum sheave diameter while the outer belt 92 is trained around a minimum sheave diameter, the extreme positions being indicated in Figures 1, 3 and 4. This results in a maximum driven speed of the clutch sheave 61.

Conversely, as the arms 112, 113 are raised in a clockwise movement about the axis of the shaft 120, as viewed in Figure 1, the belt 93 is pulled radially inwardly as the adjustable sheave 94 moves away from the driven sheave 61 while moving toward the drive sheave 91, thereby loosening the belt 92. This permits the belt 92 to be forced outwardly toward the periphery of the elements 95, 100, thereby gradually decreasing the speed of the driven sheave 61, which reaches a minimum when the axially slidable element 99 engages the element 95.

The belts 92, 93 are both tightened by shifting the adjustable pulley 94 radially inwardly along the supporting arms 112, 113 toward the supporting shaft 120. This is accomplished by means of a bifurcated adjusting element 130 disposed between the arms 112, 113 and having a pair of legs 131, 132 apertured at their ends to receive the bolts 109 and provided with a threaded adjusting rod 133 which engages the connecting yoke 134 at the opposite ends of the legs 131, 132. The adjusting rod 133 projects through an aperture in a lug 135 which is fixed, as by welding, to the supporting tube 115. A pair of nuts 136 are threaded on the adjusting rod 133 on opposite sides of the lug 135 to provide for fixing the adjusting rod 133 relative to the lug 135 in adjusted position. Shifting of the bifurcated member 130 radially inwardly toward the axis of the shaft 120 moves the adjustable sheave 94 away from both the drive pulley 91 and driven pulley 61, thus increasing the tension on both belts 92, 93.

The bell crank is adjusted about the axis of the shaft 120 by means of a control lever 140 fixed to a rockshaft 141 journaled in brackets 142 on the operator's platform 75. An arm 143 is fixed to the rockshaft 141 outwardly of the side wall 9 and is connected by means of a link 144 to the outer end of the arm 116 of the bell crank. Thus, by pulling upwardly and rearwardly on the lever 140, the operator may swing the arm 116 in a clockwise direction, as viewed in Figure 1, thereby decreasing the speed of the clutch drive sheave 61. Movement of the lever 140 forwardly and downwardly increases the speed of the sheave 61 and therefore increases the speed of movement of the machine. A notched sector 146 is provided for holding the lever 140 in any position of adjustment between upper and lower limits. The latch mechanism for engaging the sector 146 is not shown in the drawings but can be any suitable conventional device. A counterbalancing spring 147 is connected between the outer end of the arm 116 and extends downwardly and rearwardly to a connection with the frame member 125 to counterbalance the weight of the adjustable sheave 94.

The threshing and separating mechanism (not shown), disposed within the crop treating housing 6, is driven through a flat drive belt 150 trained over the cylindrical pulley 90 on the engine shaft 87 and over a large pulley 151 fixed to a drive shaft 152, to which the crop treating mechanism is connected. A belt tightening idler 153 is journaled on a bell crank 154 pivotally mounted on a stub shaft 155 on the side wall 9 of the body 6. The belt tightener 153 is controlled by means of a hand lever 157 pivoted at 158 on the operator's platform 75 and is connected by a link 159 to a toggle locking mechanism 160, which in turn is connected through a link 161 to a depending arm 162 forming a part of the bell crank 154. The toggle mechanism 160 comprises a curved element 170, the rear end of which is connected to the link 161, which is threaded and provided with a pair of adjusting nuts 171, providing for longitudinal adjustment of the link 161 relative to the element 170. The forward end of the curved element 170 is connected by a pivot bolt 172 to a vertical lever 173 pivoted at 174 on the side wall 9. The rear end of the link 159 is pivoted by means of a bolt 175 to a rearwardly extending ear 176 welded to the vertical arm 173. A tension spring 177 is connected between a lug 178 fixed to the link 161 and a bolt 179 fixed to a vertical frame member 180 mounted on the side wall 9. The spring 177 pulls rearwardly on the link 161 to hold the idler pulley 153 away from the belt 150, thereby loosening the latter and preventing any power from being transmitted to the sheave or pulley 151. The operator can connect the pulley 151 to the cylindrical pulley 90 on the engine for transmitting power through the belt 150 by pulling rearwardly on the hand lever 157, which swings the lever 173 in a clockwise direction about the bolt 174, thereby swinging the pivot 172 forwardly and upwardly until the curved arm 170 engages the pivot bolt 174. At this time, the pivot bolt 172 is above the pivot 174 so that the tension of the spring 177 acting through the link 161 tends to pull the curved element 170 into engagement with the pivot bolt 174, thereby locking the idler pulley 153 in belt tightening relation with the belt 150.

During operation in the field, the machine travels forwardly with its harvester platform 188 extending forwardly from the front end of the body 6, in the usual manner. The power plant runs at a substantially constant speed to drive the pulley 151 and the crop treating mechanism connected thereto at a constant speed. The speed of forward travel of the machine is controlled by the hand lever 140, which swings the adjustable sheave 94 to control the speed of rotation of the driven sheave 61 and therefore the speed of rotation of the traction wheels. With any speed setting of the change speed gears 42, adjustment of the pulley 94 provides a range of infinitely adjustable speeds of forward movement of the machine. When either end of the range of speed adjustment is reached and a still further adjustment is desired, the gear change mechanism can be shifted to the next speed setting, after which the adjustable sheave 94 provides a new range of speed adjustment. For example, should the operator desire to slow down, he pulls the lever 140 rearwardly until the center element 99 is in the position shown in Figure 4. Desiring a still slower speed, he then releases his clutch mechanism 45 by stepping on the pedal 84, then shifts his gears by the ratio control lever 80 to a lower speed connection, then pushes the lever 140 forwardly and downwardly until the speed of the driven sheave 61 has been increased to a value near the upper end of its speed range, and finally lets in the clutch to engage the latter. The operator can then begin to pull his speed control lever 140 rearwardly to obtain another complete range of speed control of the adjustable sheave 94 to obtain a range of speed adjustment with the lower speed setting of the change gears 42.

It will be noted that inasmuch as the clutch mechanism 45 is disposed between the V-belt sheave 61 and the gear change mechanism 42, the momentum of the moving belts 92, 93 and the rotating sheaves 94 and 61 is not transmitted to the change gear mechanism and therefore does not cause any gear clashing during the change over. It is important, therefore, to place the clutch 45 at this point, rather than between the drive sheave 91 and the power plant shaft 87.

When starting the implement from a standstill, the gear shift control lever 80 is first positioned in the desired speed combination while the operator holds the clutch 45 disengaged by means of the foot pedal 84, and also pulls the speed control lever 140 to its lowest speed position, then releases the clutch pedal 84 to engage the clutch 45 thereby starting the machine forwardly. Here it will be noted that during the adjustment of the speed lever 140 the belts 92, 93 and the adjustable sheave 94 rotate at normal speed which facilitates shifting the adjustable sheave 94 before the implement starts. Then, when the clutch is engaged to start the implement forwardly, the belts are running at normal speed during engagement of the clutch and therefore there is no condition under which the V-belts are placed under heavy tension when stationary, as would be the case if the clutch 45 were to be interposed between the sheave 91 and the engine shaft 87, which has been the cause of much belt breakage heretofore.

A brake drum 181 is mounted on the end of the shaft 41, which projects from the transmission case 38 for this purpose. A brake actuating lever 182 is mounted on a shaft 183 journaled in a pair of flanges 184 supported on a bracket 185, which is rigidly fixed to the case 38. The lever 182 is swingable about the axis of the shaft 183 to engage conventional brake mechanism (not shown) within the drum 181 to retard the forward movement of the implement 5. The brake control connections are omitted as they do not form an essential part of my invention.

I claim:

1. A self-propelled implement comprising a crop treating housing, a pair of traction wheels therefor, an axle housing extending transversely beneath said crop treating housing and carried on said wheels, power transmission mechanism associated with said axle housing and mounted thereon, said mechanism including a change gear mechanism, a V-belt sheave for transmitting power to the latter, and a disengageable clutch interposed between said sheave and said change gear mechanism, an operator's platform mounted at the forward end of said crop treating housing, a power plant mounted on said crop treating housing rearwardly of said operator's platform and having a V-belt drive sheave for driving the implement, an adjustable V-belt sheave mounted on the crop treating housing generally between said power plant and said axle housing, said adjustable sheave comprising a pair of relatively fixed conical sheave elements and a central element disposed between said pair of elements and having a pair of opposed conical surfaces cooperating with said pair of elements to form a pair of V-belt sheaves, said central element being shiftable axially relative to said pair of elements to adjust the effective diameters of said pair of sheaves, a pair of V-belts connecting said pair of sheaves with said sheaves on said power plant and said clutch, respectively, mounting means for rotatably supporting said adjustable sheave, said mounting means being shiftable bodily relative to said power plant and said clutch to adjust the speed at which the latter is driven, and control means extending from said mounting means to said operator's platform under control of the operator for shifting said mounting means.

2. A self-propelled implement comprising a crop treating housing, a pair of traction wheels therefor, an axle housing extending transversely beneath said crop treating housing and carried on said wheels, power transmission mechanism associated with said axle housing and mounted thereon, said mechanism including a change gear mechanism, a V-belt sheave for transmitting power to the latter, and a disengageable clutch interposed between said sheave and said change gear mechanism, an operator's platform mounted on top of said crop treating housing, a power plant mounted transversely on top of said crop treating housing rearwardly of said operator's platform and having a V-belt drive sheave overhanging the side of said housing, an adjustable V-belt sheave disposed on the side of said crop treating housing on a transverse axis of rotation in alignment with said power plant drive sheave and said sheave for driving said clutch, said adjustable sheave comprising a pair of relatively fixed conical sheave elements and a central element disposed between said pair of elements and having a pair of opposed conical surfaces cooperating with said pair of elements to form a pair of V-belt sheaves, said central element being shiftable axially relative to said pair of elements to adjust the effective diameters of said pair of sheaves, a pair of V-belts connecting said pair of sheaves with said sheaves on said power plant and said clutch, respectively, and mounting means for rotatably supporting said adjustable sheave, said mounting means comprising a bell crank device pivotally mounted on said crop treating housing and carrying said adjustable sheave on one arm thereof, and a control connection extending from another arm of said bell crank forwardly alongside said crop treating housing to said operator's platform to provide the operator with a remote control of the adjustable sheave to adjust the speed of travel of the implement.

RALPH L. ANDERSON.

REFERENCES CITED

The following references are of record in the file of this patent:

UNITED STATES PATENTS

| Number | Name | Date |
|---|---|---|
| 2,150,456 | Perrine | Mar. 14, 1939 |
| 2,331,976 | Hare | Oct. 19, 1943 |

FOREIGN PATENTS

| Number | Country | Date |
|---|---|---|
| 395,669 | Germany | May 22, 1924 |
| 547,857 | France | Dec. 27, 1922 |
| 693,456 | Germany | July 10, 1940 |